United States Patent Office 2,886,559
Patented May 12, 1959

2,886,559

CLAY THICKENED SUSPENSION POLYMERIZATION PROCESS WITH PLUG FLOW

Ralph M. Wiley, Midland, Mich., assignor to The Dow Chemical Company, Midland, Mich., a corporation of Delaware No Drawing. Application August 23, 1954
Serial No. 451,682

5 Claims. (Cl. 260—91.7)

This invention relates to a process for polymerizing in non-emulsified suspension one or a mixture of mono-ethylenically unsaturated substantially water-immiscible polymerizable monomeric vinylidene compounds, typically vinylidene chloride, styrene, and the like.

Vinylidene chloride is difficult to polymerize by the previously disclosed polymerization processes. Because of the extremely low heat stability of its polymers, it is impractical to polymerize it by mass polymerization. Because its polymers are insoluble in most of the inexpensive solvents, solution polymerization processes are impractical. Latexes of vinylidene chloride polymers are difficult to produce in commercial polymerization equipment because of the low mechanical stability of the latexes. Also, the polymers produced by coagulating such latexes contain appreciable amounts of substances, such as emulsifiers and coagulating agents, which frequently impair the light and heat stability of the polymer. To date, aqueous suspension polymerization processes have been the most successful. The disadvantages of such processes have been that they do not lend themselves well to continuous operation, the particle size is frequently so large that an additional grinding step is necessary, and excessively large amounts of water have to be employed. In addition, agitators have had to be operated at such high speeds to prevent settling of the dispersion that some of the polymerized granules are ground to an extremely fine powder that is difficult to feed into conventional fabricating equipment. The turbulence created by such high rates of agitation is difficult to reproduce, causing variations in the polymerizing conditions from batch to batch. Such turbulence is particularly difficult to reproduce when the scale of operations is changed.

It is an object of this invention to provide an improved aqueous suspension polymerization process for polymerizing water-insoluble monomers.

It is a further object to provide such a process which can be operated both batchwise and continuously.

It is an additional object to provide such a process in which the ratio of the amount of water to the amount of monomer is kept low.

It is a still further object to provide a process requiring little or no agitation to maintain the dispersion.

The above and related objects are accomplished with a process for polymerizing vinylidene chloride in a non-emulsified, high solids, thickened aqueous suspension of particles under such conditions as to avoid coalescence of the polymerizing particles and to produce reasonably uniform particles of a stable polymeric product at a reasonable rate.

The initial dispersion is prepared by agitating a monomer and water mixture. As is well known, when an oily or water-immiscible organic material is dispersed into droplets in water by means of agitation and the agitation is stopped, the droplets will immediately coalesce to reestablish two layers of oil and water. Experience has shown that the addition of a small amount of certain hydrophilic colloids, such as methyl cellulose, will stabilize the dispersion to coalescence and once the particles are formed they will maintain their size. The degree or rate of agitation is a principal factor in determining the initial size of the droplets. In general, the greater the rate of agitation, the smaller will be the resulting droplets.

The concentrated suspensions which are useful in the process of this invention should contain from 35 to 50 percent by volume of water phase. When less than 30 percent water is used the resulting polymer dispersions are not sufficiently fluid to be used in the process. When greater than 50 percent water is used, the process may become uneconomical because more colloid is required, greater amounts of water have to be heated and cooled, and the amount of polymer produced per unit of vessel space is less.

To keep the particles isolated from one another before, during, and after polymerization without agitation it is necessary to thicken the aqueous phase. This is particularly important in the later stages of the polymerization where solid polymer particles in an unthickened aqueous phase tend to pack so firmly that they pour only with considerable difficulty.

The thickeners that are useful in the process of this invention are hydrophilic colloidal clays. Especially useful clays are the bentonite clays. Such clays are conveniently flocculated with an electrolyte, particularly aluminum sulfate, to condition them for use as thickeners. The flocculated clay dispersions are made by dispersing the clay in cold water and then adding a minor amount of aluminum sulfate. The amounts of clay and aluminum sulfate that should be employed may be determined by simple preliminary experiment. The amounts should be such that when dispersed in the amount of water alone which would be employed in the intended polymerization the viscosity of the dispersion will be in the range of from 600 to 1000 centipoises at room temperature. The requirements of the thickener are manifold. It must be water-soluble or water-dispersible and thicken the aqueous phase at low concentrations. It must be inert to the polymerization system, e.g. peroxides must not decompose or degrade it thus destroying its effectiveness. It must have no appreciable effect on the granulating efficiency of the system. It must maintain its thickening ability at the polymerization temperatures. It should remain exclusively in the aqueous phase during polymerization, although if a minor amount enters the oil phase it should have no deleterious effect on the polymer properties.

To further define the thickeners, they must form water solutions that are non-Newtonian. When thickeners accomplish their intended function in preventing gravitational separation of the particle droplets in the aqueous phase due to differences in density of the two phases, it is necessary that a positive stress be applied before the dispersion will flow. It should be obvious that the magnitude of the stress to cause flow must be greater than the stress exerted on the surrounding medium by the suspended droplet of the individual droplets.

Thickened aqueous suspensions have been employed in the past in conventional highly agitated polymerization systems without any beneficial results. However, nowhere is the unique set of requirements on the thickeners of this invention taught which will allow a polymerization to proceed with a low rate of agitation or in a non-turbulent condition, to produce discrete polymer particles of substantially uniform size.

It is not known why certain thickeners will work and others will not. While we do not wish to be limited to any particular theory, it is believed that the operable thickeners not only cushion the particles and prevent packing but in addition provide sufficient lubricity so that the particles will easily slide past each other. Some thickeners are adversely affected by large changes of pH and consequently must be buffered. This is particularly true of potato starch.

The concentrated dispersion may be prepared by agitating the desired amount of monomer in an excess of water containing the proper amount of hydrophilic colloid as granulating agent. After stopping the agitation the dispersion is allowed to settle and the excess water decanted following which the thickener is added. It should be apparent that the greater the initial excess of water, the more granulator will have to be used, and the greater the agitation will have to be to attain a given particle size. Another method that may be employed is to make up the complete aqueous phase (water, catalyst, granulating agent and thickener) and then disperse the monomer in that phase.

The polymerization vessel is jacketed or has some other means for heating and cooling the charge. When the vessel is filled with the concentrated dispersion of monomer in the thickened aqueous phase, polymerization is initiated by warming the dispersion.

The process is particularly well suited for use in continuous polymerization techniques, because the system presents the possibility for plug flow. Since the droplets cannot travel through the aqueous medium under their own weight and there is no turbulence or end-to-end mixing in the polymerization vessel the possibility of short-circuiting is nil. Thus, polymerization is possible in coils, tubes, and cylinders adapted for continuously introducing the thickened dispersions into one end and for continuously withdrawing the mass of beads of polymer at the other.

The process of the invention will be more apparent from the following illustrative examples. All parts are by weight.

*Example 1*

80 parts of vinylidene chloride containing 0.4 part of benzoyl peroxide was stirred vigorously into 160 parts of water containing 0.1 percent of methyl cellulose. The suspension was allowed to settle and 100 parts of water decanted. The dispersion was thickened by the introduction of 20 parts of an aqueous solution containing 3.2 parts of bentonite clay flocculated with 0.1 part of aluminum sulfate. The resulting mixture was held at 50° C. for 48 hours in a non-turbulent condition. The product was a uniformly granulated mass of polymer which was free flowing and after drying was suitable for use in extrusion operations.

By way of contrast when the flocculated bentonite clay was omitted, the polymer formed into hard lumps which had to be broken up and ground before use, unless continuous vigorous agitation was used.

*Example 2*

A cylindrical vessel was set up for continuous polymerization. The vessel was disposed vertically and was jacketed for heating and cooling the charge. A vertical agitator having a series of paddles was suspended within the vessel. The bottom of the vessel was conically shaped and was fitted with an automatic valve. A means was provided for continuously producing and transferring a monomer dispersion to the polymerization vessel.

100 parts per hour of vinylidene chloride containing 0.4 part of benzoyl peroxide as a polymerization catalyst was fed continuously into the dispersing apparatus together with 50 parts/hr. of an aqueous phase containing 0.2 part methyl cellulose. Added to the dispersed monomer were 50 parts/hr. of a 4.0 percent aqueous dispersion of flocculated bentonite clay. The dispersion was fed into the polymerization vessel and allowed to fill the vessel. The agitator was operated at 2 r.p.m. to aid heat transfer but to avoid turbulence and polymerization initiated by heating the charge to 50° C. The dispersion was continually fed into the filled vessel and a similar amount continually withdrawn from the bottom. The product from the first few hours polymerization was incompletely polymerized and was discarded. After that, however, a continuous mass of free-flowing uniform beads of polymer were withdrawn.

*Example 3*

The process of Example 1 was repeated using styrene in place of vinylidene chloride. The aqueous phase was buffered to pH 6.0. The resulting polymer was a closely packed but free-flowing mass of uniform polystyrene beads.

When the process was repeated attempting to substitute gelatin, polyethylene glycol, polyvinyl alcohol, or polyvinyl methyl ether in place of the potato starch, hard lumps of polymer were formed which had to be ground before use.

The invention has been illustrated with respect to the polymerization of vinylidene chloride and of styrene, but is not so-limited. It is applicable as well to the preparation of polymers or copolymers of monoethylenically unsaturated vinylidene compounds, such as vinyl chloride, vinyl acetate, acrylonitrile, and the polymerizable esters of acrylic and methacrylic acids, so long as the monomer or monomers employed are substantially insoluble in water. It is especially useful in making copolymers of vinyl and vinylidene chlorides.

I claim:

1. The method which consists essentially in dispersing by means of agitation at least one water-immiscible monoethylenically unsaturated monomeric vinylidene compound selected from the group consisting of the polymers of styrene, vinylidene chloride, vinyl chloride, vinyl acetate, acrylonitrile, alkyl acrylates and alkyl methacrylates and the copolymers of said monomers in an aqueous medium containing a hydrophilic colloidal granulating agent, under conditions of agitation to form monomer droplets of the desired size, thickening the dispersion by distributing through the aqueous phase thereof a hydrophilic colloidal clay in amounts which when added alone to an amount of water equal to the amount of water in said aqueous phase, would give a dispersion of from 600 to 1000 centipoises, viscosity discontinuing dispersive agitation, and subjecting the so-thickened monomer dispersion to the action of catalytic and thermal conditions known to induce polymerization of the monomer, while avoiding turbulence in the thickened dispersion and while maintaining said monomer droplets in substantially fixed spatial relationship to one another, thereby to produce uniform beads of the polymers.

2. The method claimed in claim 1, wherein the hydrophilic colloidal clay employed is flocculated bentonite.

3. The method claimed in claim 1, wherein the dispersion contains from 35 to 50 percent of water by volume.

4. The method claimed in claim 1, wherein the monomer comprises vinylidene chloride.

5. The method claimed in claim 1, wherein the monomer is styrene.

References Cited in the file of this patent

UNITED STATES PATENTS

| 2,494,517 | Naps | Jan. 10, 1950 |
| 2,576,720 | Marks | Nov. 27, 1951 |
| 2,694,700 | Shanta | Nov. 16, 1954 |
| 2,701,245 | Lynn | Feb. 1, 1955 |

FOREIGN PATENTS

| 594,653 | Great Britain | Nov. 17, 1947 |

OTHER REFERENCES

Hohenstein et al.: J. Polymer Science 1, 127, 137–139, (1946).